图像参考:

(12) United States Patent
Eidelson et al.

(10) Patent No.: US 9,665,547 B1
(45) Date of Patent: May 30, 2017

(54) FACILITATING WEBPAGE NAVIGATION

(71) Applicant: Google Inc., Mountain View, CA (US)

(72) Inventors: Benjamin David Eidelson, San Francisco, CA (US); Jason Prado, San Franicsco, CA (US); Christopher Reaves Messina, San Francisco, CA (US); Doug Sherrets, San Francisco, CA (US)

(73) Assignee: Google Inc., Mountain View, CA (US)

( * ) Notice: Subject to any disclaimer, the term of this patent is extended or adjusted under 35 U.S.C. 154(b) by 422 days.

(21) Appl. No.: 13/727,888

(22) Filed: Dec. 27, 2012

(51) Int. Cl.
    *G06F 17/22* (2006.01)

(52) U.S. Cl.
    CPC ............................... *G06F 17/2247* (2013.01)

(58) Field of Classification Search
    USPC ......................................................... 715/206
    See application file for complete search history.

(56) References Cited

U.S. PATENT DOCUMENTS

| | | | | |
|---|---|---|---|---|
| 6,742,030 | B1 * | 5/2004 | MacPhail ........... | G06F 17/30876 707/E17.112 |
| 8,386,915 | B2 * | 2/2013 | Howes et al. ................ | 715/205 |
| 8,543,900 | B1 * | 9/2013 | Kent ............................ | 715/205 |
| 8,732,569 | B2 * | 5/2014 | Burkard et al. .............. | 715/206 |
| 2008/0320124 | A1 * | 12/2008 | Lee et al. ..................... | 709/224 |
| 2010/0251128 | A1 * | 9/2010 | Cordasco ............ | G06F 11/3409 715/736 |
| 2011/0087966 | A1 * | 4/2011 | Leviathan ......... | G06F 17/30905 715/745 |
| 2011/0202522 | A1 * | 8/2011 | Ciemiewicz et al. ........ | 707/711 |
| 2012/0137201 | A1 * | 5/2012 | White et al. .................. | 715/205 |
| 2012/0239489 | A1 * | 9/2012 | Peretti et al. .............. | 705/14.45 |
| 2013/0073509 | A1 * | 3/2013 | Burkard ............ | G06F 17/30864 706/52 |
| 2014/0114761 | A1 * | 4/2014 | Lee .................... | G06Q 30/0241 705/14.54 |

OTHER PUBLICATIONS

"SEO Prediction: Google Rankings Shakedown by 2015", retrieved from https://www.mainstreetroi.com/prediction-google-rankings-shakedown-by-2015/.*

* cited by examiner

*Primary Examiner* — Stephen Hong
*Assistant Examiner* — Sanchita Roy
(74) *Attorney, Agent, or Firm* — Patent Law Works LLP (57) ABSTRACT

A computer-implemented method, computer program product, and computing system is provided for assisting a user navigating a webpage or website. In an implementation, a method may include identifying a plurality of navigation options associated with a webpage. The method may also include determining visitor navigation patterns associated with the plurality of navigation options. The method may further include providing a visual indicator based on, at least in part, the visitor navigation patterns, the visual indicator associated with a rendering of the webpage.

24 Claims, 5 Drawing Sheets

FACILITATING WEBPAGE NAVIGATION

BACKGROUND

The use of the Internet has permeated most areas of modern life. For example, the Internet is an increasingly integral aspect of business, social interaction, information collection and dissemination, as well as touching various other aspects of modern life. The increasing volume of information and complexity of webpages and websites can, at times, make it difficult and/or cumbersome for a user to easily interact with a webpage, for example, to find the desired information.

SUMMARY OF DISCLOSURE

According to an implementation, a method may include identifying, by a computing device, a plurality of navigation options associated with a webpage. The method may also include determining, by the computing device, visitor navigation patterns associated with the plurality of navigation options. The method may further include providing, by the computing device, a visual indicator based on, at least in part, the visitor navigation patterns, the visual indicator associated with a rendering of the webpage.

One or more of the following features may be included. The navigation options may include one or more hyperlinks. The visitor navigation patterns may include historical navigation data associated with the webpage. The visual indicator may include a heatmap.

The method may also include filtering the visitor navigation patterns, and providing the visual indicator based on, at least in part, the filtered visitor navigation patterns. One or more user attributes may be determined. Filtering the visitor navigation patterns may be based on, at least in part, the one or more user attributes. One or more session attributes may be determined. Filtering the visitor navigation patterns may be based on, at least in part, the one or more session attributes. A navigation order associated with the visitor navigation patterns may be determined. Filtering the visitor navigation patterns may be based on, at least in part, a navigation order associated with the visitor navigation patterns.

According to another implementation, a computer program product may include a non-transitory computer readable medium having a plurality of instructions stored on it. When executed by a processor, the instructions may cause the processor to perform operations including identifying a plurality of navigation options associated with a webpage. The operations may also include determining visitor navigation patterns associated with the plurality of navigation options. The operations may further include providing a visual indicator based on, at least in part, the visitor navigation patterns, the visual indicator associated with a rendering of the webpage.

One or more of the following features may be included. The navigation options may include one or more hyperlinks. The visitor navigation patterns may include historical navigation data associated with the webpage. The visual indicator may include a heatmap.

Instructions may also be included for filtering the visitor navigation patterns, and for providing the visual indicator based on, at least in part, the filtered visitor navigation patterns. One or more user attributes may be determined. Filtering the visitor navigation patterns may be based on, at least in part, the one or more user attributes. One or more session attributes may be determined. Filtering the visitor navigation patterns may be based on, at least in part, the one or more session attributes. A navigation pattern associated with the visitor navigation patterns may be determined. Filtering the visitor navigation patterns may be based on, at least in part, the navigation order associated with the visitor navigation patterns.

According to another implementation, a computing system may include at least one processor. The at least one processor may be configured to identify a plurality of navigation options associated with a webpage. The at least one processor may also be configured to determine visitor navigation patterns associated with the plurality of navigation options. The at least one processor may further be configured to provide a visual indicator based on, at least in part, the visitor navigation patterns, the visual indicator associated with a rendering of the webpage.

One or more of the following features may be included. The navigation options may include one or more hyperlinks. The visitor navigation patterns may include historical navigation data associated with the webpage. The visual indicator may include a heatmap.

The at least one processor may be further configured for filtering the visitor navigation patterns, and for providing the visual indicator based on, at least in part, the filtered visitor navigation patterns. One or more user attributes may be determined. Filtering the visitor navigation patterns may be based on, at least in part, the one or more user attributes. One or more session attributes may be determined. Filtering the visitor navigation patterns may be based on, at least in part, the one or more session attributes. A navigation order associated with the visitor navigation patterns may be determined. Filtering the visitor navigation patterns may be based on, at least in part, the navigation order associated with the visitor navigation patterns.

These and other implementations may, in some instances and/or situations, assist a user in navigating a webpage or website to find information that may be of interest to the user. For example, according to some implementations, the user may be provided with cues that may suggest possible navigation options for the user within a webpage or website. The cues of possible navigation options may include, for example, suggestions as to where on a webpage a user may click or scroll, based on, at least in part, where other visitors to the webpage or website have clicked or scrolled. In some instances, the suggestions based on, at least in part, where other visitors to the webpage have clicked or scrolled may consider similarities and/or differences between the user and other visitors to the webpage, for example, with regards to interests of the user and other visitors, how the user and other visitors arrived at the webpage for which navigation cures are provided, demographic similarities and/or differences, or as well as various additional/alternative characteristics. Accordingly, in some instances an implementation of the present disclosure may assist a user in finding information or content on a webpage or website in which the user is interested.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

According to some example implementations consistent with the present disclosure, a user may access a webpage or website including a plurality of webpages. For example, the user may access the webpage or website with the objective of acquiring some information, such as a specific piece of information and/or information relating to a specific or general topic. In some instances, the information that the user is interested in may not be readily apparent to the user. This can often occur in connection with webpages or websites that include a relatively large amount of content, or event when the webpage or website includes a layout or organization that may be unfamiliar to the user. Navigation options within the webpage or website may be identified, in which the navigation options may include different portions of the webpage or website that may be accessed by scrolling within one or more webpage, or selecting links included within a webpage or website that may direct the user to content within the webpage or website, or content that may be included on another webpage or website. The user may be provided with cues for navigating the webpage or website, such as navigation suggestions as to where within the webpage the user may scroll and/or links that the user may select. The navigation suggestions may be based on, at least in part, navigation paths that have been taken by previous visitors to the webpage or website. In some instances, the navigation suggestions or cues may be based on navigation paths that have been taken by previous visitors that have some common characteristic or feature with user. As such, in some instances a user may be provided with cues that may allow the user to relatively easily ascertain how he may access content that is likely to be of interest to him.

Figure 1:
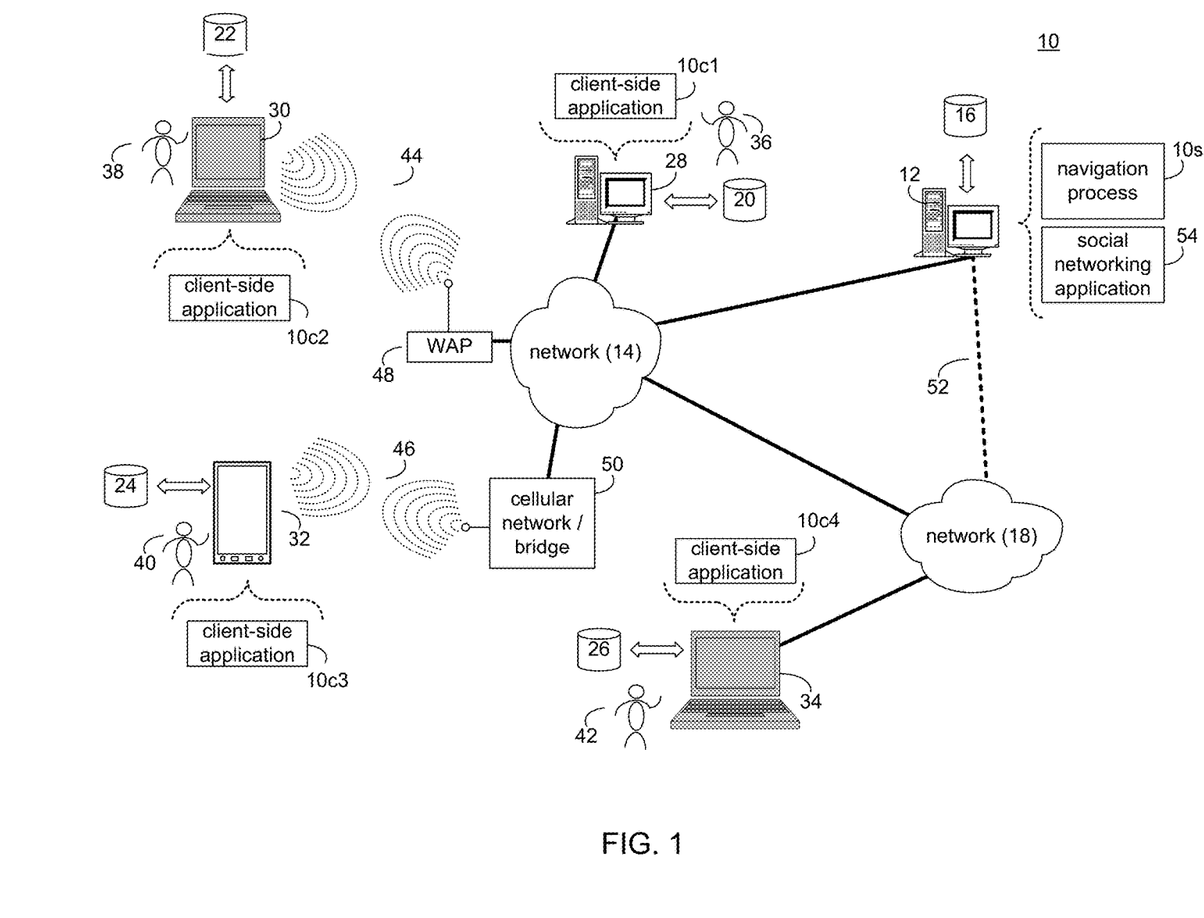
FIG. 1 is a diagrammatic view of a distributed computing network including a computing device that executes a navigation process according to an implementation of the present disclosure.

Referring to FIG. 1, there is shown navigation process 10. For the following discussion, it is intended to be understood that navigation process 10 may be implemented in a variety of ways. For example, navigation process 10 may be implemented as a server-side process, a client-side process, or a server-side/client-side process.

For example, navigation process 10 may be implemented as a purely server-side process via navigation process 10s. Alternatively, navigation process 10 may be implemented as a purely client-side process via one or more of client-side application 10c1, client-side application 10c2, client-side application 10c3, and client-side application 10c4. Alternatively still, navigation process 10 may be implemented as a server-side/client-side process via navigation process 10s in combination with one or more of client-side application 10c1, client-side application 10c2, client-side application 10c3, and client-side application 10c4. In such an example, at least a portion of the functionality of navigation process 10 may be performed by navigation process 10s and at least a portion of the functionality of navigation process 10 may be performed by one or more of client-side application 10c1, 10c2, 10c3, and 10c3.

Accordingly, navigation process 10 as used in this disclosure may include any combination of navigation process 10s, client-side application 10c1, client-side application 10c2, client-side application 10c3, and client-side application 10c4.

Figure 2:
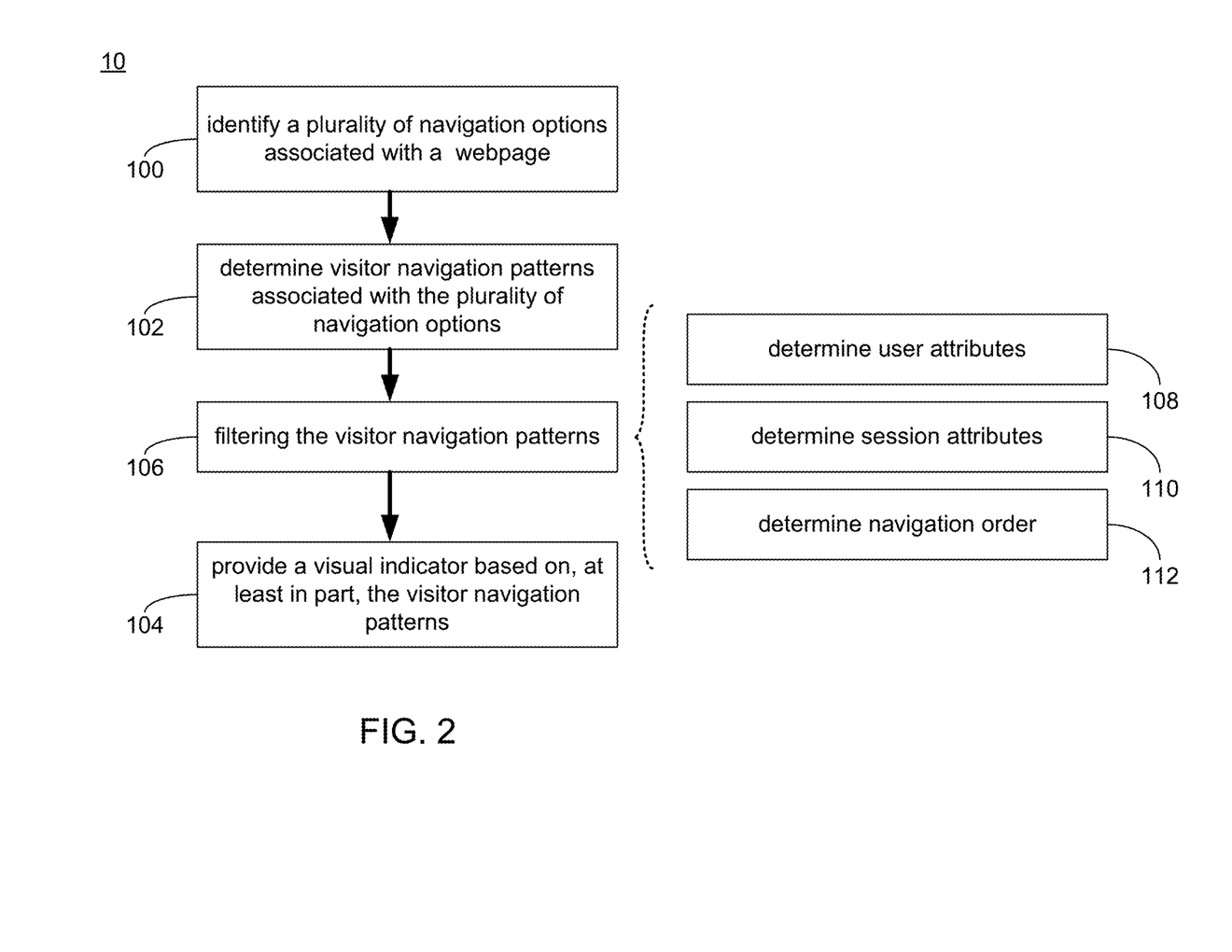
FIG. 2 is a flowchart of the navigation process of FIG. 1, according to an implementation of the present disclosure.

Referring also to FIG. 2, and as will be discussed in greater detail below, navigation process 10 may identify 100 a plurality of navigation options associated with a webpage. Navigation process 10 may also determine 102 visitor navigation patterns associated with the plurality of navigation options. Navigation process 10 may further provide 104 a visual indicator based on, at least in part, the visitor navigation patterns, the visual indicator associated with a rendering of the webpage.

Navigation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of navigation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access navigation process 10 directly through network 14 or through secondary network 18. Further, navigation process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth™ device that is capable of establishing wireless communication channel 46 between laptop computer 30 and WAP 48. Additionally, personal computer 34 is shown directly coupled to network 18 via a hardwired network connection.

As generally discussed above, navigation process 10 may generally provide navigation cues or suggestions with respect to a webpage that may facilitate a user in finding content that may be of interest to the user. The content that may be of interest to the user may be included on the webpage, on a website associated with the webpage, or on another webpage or website that is linked to from the original webpage with respect to which the navigation cues or suggestions are provided. Accordingly, navigation cues or suggestions as used herein may include navigation cues or suggestions for accessing content on a single webpage or website, or on a variety of related or unrelated webpages or websites.

Navigation cues or suggestions provided by navigation process 10 may be based on content that the user may likely wish to access. Content that the user may likely wish to access may be based on, for example, patterns of content access (e.g., types of content, orders in which content is accessed, etc.) by previous visitors to the webpage. In some instances, the previous visitors to the webpage (e.g., whose navigation patterns may be utilized, at least in part, to provide navigation cues or suggestions to the user) may include visitors having some point of commonality with the user, such as a common interest, a common basis for arriving at the webpage, or the like. As such, in some implementations, the navigation cues or suggestions provided by navigation process 10 may have a relatively higher likelihood of being relevant to the user (e.g., assisting the user in navigating to the content of interest).

In various implementations, navigation process 10 may include functionality associated with a webpage, e.g., in which navigation cues or suggestions may be provided by the webpage being accessed by the user. In some implementations, navigation process 10 may include functionality associated with a web browser, e.g., which may access navigation information associated with one or more websites (e.g., including the webpage being accessed by the user), and may provide navigation cues or suggestions based on the navigation information. In some embodiments, navigation process 10 may include functionality provided in part by the webpage being accessed by the user and provided by a web browser, or other application, used to access the webpage.

As discussed above, navigation process 10 may generally identify 100 a plurality of navigation options associated with a webpage. Navigation process 10 may also determine 102 visitor navigation patterns associated with the plurality of navigation options. Navigation process 10 may further provide 104 a visual indicator based on, at least in part, the visitor navigation patterns, the visual indicator associated with a rendering of the webpage.

Navigation process 10 may identify 100 a plurality of navigation options associated with a webpage. For example, the plurality of navigation options associated with a webpage may include hyperlinks included on the webpage, locations of content on the webpage and the like. For example, and referring also to FIG. 3, a user (e.g., user 36) may access a webpage (e.g., webpage 150) using client-side application 10c1 (e.g., which may include a web browser and/or provide, at least in part, web browser functionality) that may be executed by client electronic device 28. As shown, webpage 150 may include content (e.g., content 152 that may include text, pictures, etc.), and may also include one or more links (e.g., links 154-168, which may include hyperlinks). While example webpage 150 includes both content 152 and links 154-168, it will be appreciated that this is for the purpose of illustration only, as other webpages may not include both text or picture content and links.

Figure 3:
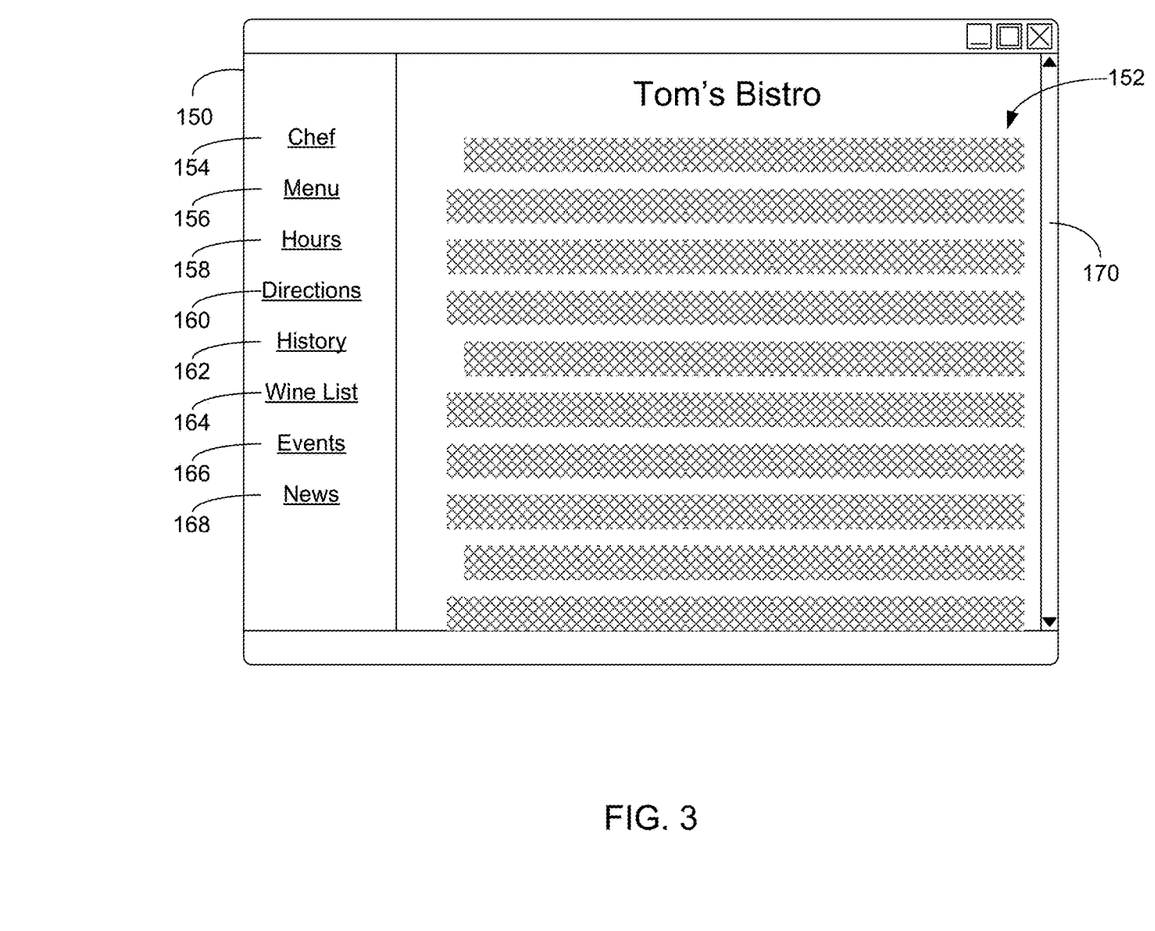
FIG. 3 is diagrammatic representation of a webpage that may be navigated at least in part in connection with the navigation process of FIG. 1, according to an implementation of the present disclosure.

Consistent with the illustrated example of FIG. 3, content 152 and links 154-168 may each include navigation options associated with webpage 150. For example, user 36 may navigate content 152 by scrolling through the text and/or pictures included within content 152 (e.g., via scroll-bar 170, or other suitable navigation means). For example, content 152 could include one, or many, screens of content that may be navigated by user 36. Further, content 152 may include one or more sections (e.g., which may or may not be delineated by headings, titles or the like), and may, therefore provide a variety of information. Similarly, links 154-168 may each be associated with a section of content 152 within webpage 150, and/or may be associated with another webpage, either included in the same website as webpage 150 and/or associated with a different website than webpage 150. One or more of links 154-168 may allow user 36 to navigate to a specific portion of content 152 (e.g., a hyper link may be associated with a particular portion of content 152) based on metadata associated with the portion of content 152, etc. Further, one or more of links 154-168 may allow user 36 to navigate to one or more additional pages as a target designated by the link. Navigation process 10 may identify 100 one or more of the navigation options associated with webpage 150, for example, content 152 (e.g., which may be navigated via scroll bar 170, a scroll wheel associated with a mouse pointing device, scroll functionality associated with a touch input device, cursor control keys of a keyboard, etc.), and links 154-168 (e.g., which may be navigated by selecting one or more of the links using a suitable input device, such as a mouse, a touch input device, or the like).

Navigation process 10 may also determine 102 visitor navigation patterns associated with the plurality of navigation options. For example, and still referring to example webpage 150, navigation process 10 may determine 102 visitor navigation patterns associated with one or more of content 152 and links 154-168. In this regard, the visitor navigation patterns may include historical navigation data associated with the webpage. For example, the visitor navigation patterns may include indicators of links that other visitors to the webpage of clicked on and/or portions of the webpage that other visitors have scrolled to. Determining 102 the visitor navigation patterns may include conducting statistical analysis of the navigation patterns of visitors to the webpage, for example, including the relative frequency with which different links are clicked by visitors of the webpage, and the like. Navigation process 10 may, for example, associate an indicator of frequency with which each possible navigation option (e.g., navigation to various particular portions of content 152 and/or selection of each of links 154-168) may be selected by visitors to webpage 150. In some implementations, determining 102 the visitor navigation patterns may include disregarding (or otherwise recognizing) navigation options by the visitor that may be rapidly followed by a click-back (e.g., a return to the immediately prior location), which may indicate that the visitor did not find the information that she was seeking For example, in the context of example webpage 150, which may be a webpage associated with a restaurant, previous visitors to webpage 150 may frequently select link 156 e.g., which may direct the visitor (i.e., cause to be displayed via a web browser utilized by the visitor to access webpage 150) to a portion of content 152, and/or another webpage that includes a menu associated with the restaurant. Similarly, visitors to webpage 150 may also frequently select links 158 and 160, e.g., which may respectively direct a visitor to a portion of content 152, and/or one or more other webpages that include the hours of operation of the restaurant and directions (e.g., textual and/or map-based) to the restaurant. Further, navigation process 10 may determine 102 navigation patterns associated with visitors to webpage 150, including a relative order in which navigation options may be selected by the visitors. For example, in the context of webpage 150, visitors may frequently select menu link 156, and subsequently select hours link 158 and/or directions link 160 (e.g., having decided that they may wish to visit the restaurant after having viewed the menu).

As generally discussed above, the visitor navigation patterns may include historical navigation data associated with webpage. The historical navigation data may indicate statistical navigation patterns for the life of the webpage and/or may indicate changes in navigation patterns of visitors to the webpage overtime. For example, as new or different content (including links, etc.) are added to the webpage, or as different information becomes of greater interest to visitors to the webpage, the navigation patterns of visitors to the webpage may change.

In some implementations, navigation process 10 may filter 106 the visitor navigation patterns. Navigation process 10 may apply different filters to the visitor navigation patterns, for example, to show navigation patterns of visitors having similar interests, likes, browsing histories, etc., as a user currently accessing the webpage. Other filters may also be employed. Filtering 106 the visitor navigation patterns may be based on, at least in part, one or more user attributes. For example, navigation process 10 may filter 104 the visitor navigation patterns to determine 102 visitor navigation patterns associated with visitors having similar attributes to the user (e.g., which may therefore be more indicative of likely navigation patterns for the user). User attributes may include, for example, interests of the user, location information associated with the user, a browsing history associated with the user, or the like.

Navigation process 10 may determine 108 user attributes (e.g., which may be utilized in connection with filtering the visitor navigation patterns) in a variety of manners. For example, the user (e.g., user 36) may have an associated account with a social networking application, in which user 35 may indicate various interests, likes, dislikes, etc. Similarly, user 36 may post comments to pages included within a social networking application, e.g., which may include indications of likes, dislike, interests, etc., of user 36. Navigation process 10 may access one or more social networking applications and/or other websites that user 36 may have commented on. Similarly, navigation process 10 may determine one or more location-based attributes, for example, based on a location of a computing device utilized by the user (e.g., which may be based on GPS information, hardwired network location information, or the like). In some instances a location associated with the user may be indicative of possible likes, dislikes, and/or interests of the user. For example, if the user has an identified location of Massachusetts and the user is accessing a website including sports information, navigation process 10 may determine that user 36 may like and/or be interested in sporting teams from Massachusetts. Furthermore, navigation process 10 may determine a browsing history for user 36 (e.g., based on a history file associated with a web browser utilized by user 36, information provided by one or more cookies, or the like). Navigation process 10 may determine one or more interests associated with user 36 based on other websites that user 36 may have visited.

In some implementations, navigation process 10 may determine 110 one or more session attributes, and may filter 106 the visitor navigation patterns based on, at least in part, the determined 110 one or more session attributes. The one or more session attributes may include, for example, information regarding how the user (e.g., user 36) arrived at a particular webpage (e.g., webpage 150 in the foregoing example). For example, user 36 may have arrived at webpage 150 based upon, at least in part an internet search, based on directly imputing a URL associated with webpage 150, by selecting a link included on another webpage, or the like. Navigation process 10 may filter 106 visitor navigation patterns based on visitors that may have utilized similar search terms to arrive at webpage 150, visitors that may have arrived at webpage 150 by selecting a link on another webpage (e.g., and may further filter visitor navigation patterns based on visitors that selected a link on the same page that user 36 selected the link), etc.

In some instances, navigation process 10 may filter 106 the visitor navigation patterns based on, at least in part, one or more user selected filters. For example, user 36 may provide (e.g., via a suitable input or selection interface) a selection to filter visitor navigation patterns based on where most visitors spend most time (e.g., which navigation options selected by previous visitors result in the visitor spending the most time at the resulting location of the selected navigation option), which navigation option is abandoned the least (e.g., which may be evidenced by click-backs within a given time period), or the like. Further, in some implementations, the navigation process 10 may filter the visitor navigation patterns based on requirements or options provided by the administrator of webpage 150. For example, the administrator of webpage 150 may restrict and/or control which visitor navigation patterns may be accessible or usable by navigation process 10 for filtering 106.

In some instances, navigation process 10 may determine 112 a navigation order associated with the visitor navigation patterns, and may filter 106 the visitor navigation patterns based on, at least in part, the determined 112 navigation order associated with the visitor navigation patterns. For example, as generally discussed above, navigation process 10 may determine 102 navigation patterns associated with visitors to webpage 150, including a relative order in which navigation options may be selected by the visitors. Filtering 106 the visitor navigation patterns based on, at least in part, a navigation order associated with the visitor navigation patterns may include identifying a relative frequency that visitors to a webpage may select a navigation option in consideration of other navigation options that have been previously selected. For example, in the context of webpage 150, and assuming visitors may frequently select menu link 156, and subsequently select hours link 158 and/or directions link 160 (e.g., having decided that they may wish to visit the restaurant after having viewed the menu), from a state in which a visitor has not previously selected menu link 156 it may be statistically less likely that the visitor will select either hours link 158 or directions link 160.

Navigation process 10 may weight visitor navigation patterns based on, at least in part, filter results/criteria. For example, as will be generally understood, navigation process 10 may determine 102 visitor navigation patterns associated with a plurality of prior visitors of the webpage. Certain prior visitors may generally correspond to one or more filter criteria. Navigation process 10 may weight the navigation patterns of the visitors that generally correspond to one or more filter criteria more heavily than the navigation patterns of visitors to the webpage that do not correspond to one or more filter criteria. In some implementations, navigation process 10 may determine 102 visitor navigation patterns only for those visitors that may correspond to one or more filter criteria. Other implementations may also be utilized.

Navigation process 10 may further provide 104 a visual indicator based on, at least in part, the visitor navigation patterns, the visual indicator associated with a rendering of the webpage. The visual indicator may, for example, provide the user with navigation cues or suggestions, that may assist the user in locating and consuming content that the user is likely to desire or be interested in based upon content that has been determined to have been desired or of interest to prior visitors to the webpage, as may be evidenced from the navigation patterns of the prior visitors. In some implementations, navigation process 10 may provide 104 the visual indicators based on, at least in part, the filtered 106 visitor navigation patterns.

The visual indicator may include a heatmap, which may suggest navigation options to the user based on, at least in part, a frequency of the navigation options being exercised by prior visitors to the webpage. The heatmap may assist a user in determining where he may be interested in clicking (e.g., links to select) or scroll to (e.g., within content included on the webpage). It will be appreciated that other visual indicators may be equally utilized, however, for the sake of description, the term heatmap will be utilized. A heatmap (or other visual indicator) may utilize colors, shapes, indicators within a margin of the webpage, or the like, to provide navigation cues for the user, e.g., which may indicate where the user may scroll to or click (e.g., based on where previous visitors to the webpage have scrolled to or clicked). Different levels of color or boldness (e.g., of text items, such as links, etc.) may be used to provide a visual indicator of navigation cues or suggestions.

Navigation process 10 may provide 106 the visual indicator for all webpages, for webpages supporting navigation cues, and/or in response to a user selecting an option to view the heatmap. For example, and referring also to FIG. 4, user 36 may select (via an onscreen pointer, a touch interface, or the like) "heatmap" button 172 from within webpage 150. As generally discussed above, navigation process 10 may be provided by webpage 150 (e.g., may include an embedded feature within webpage 150). In such an implementation, selecting "heatmap" button 172 may provide a navigation heatmap as webpage content. In some implementations, navigation process 10 may be provided as web browser functionality, or functionality arising from a different application. In such an implementation, selection of "heatmap" button 172 may provide a navigation heatmap overlaid onto the webpage. Other implementations may similarly be utilized.

Figure 4:
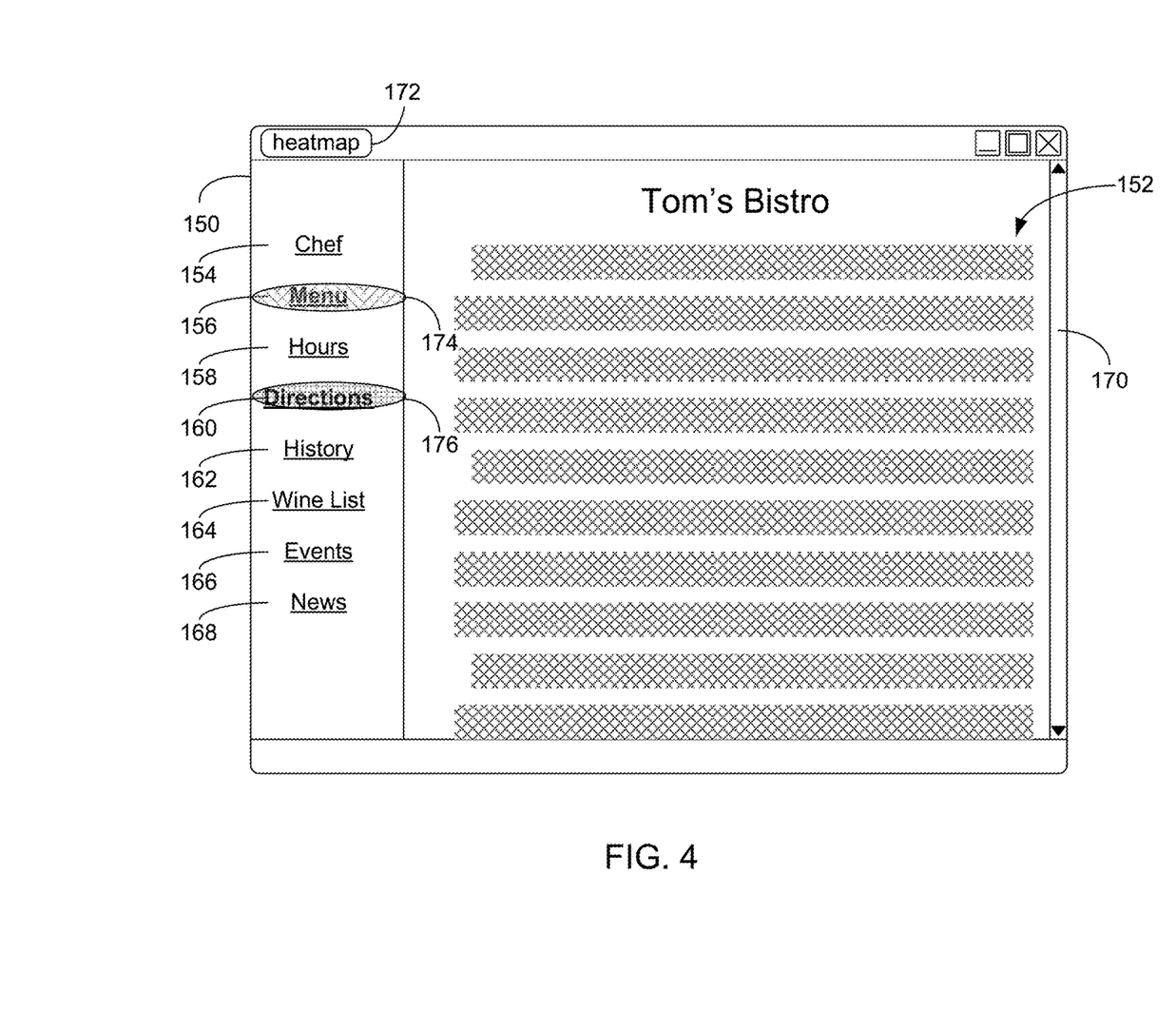
FIG. 4 is a diagrammatic representation of a webpage that may be navigated at least in part in connection with the navigation process of FIG. 1, according to an implementation of the present disclosure.

In an implementation, the heatmap may provide an indication or suggestion of orders of navigation. As discussed above in an example, visitors to a restaurant webpage may tend to navigate to a menu for the restaurant (e.g., a webpage or portion of content including a menu) and may subsequently navigate to hours of operations and/or directions (e.g., may navigate to a webpage or a portion of content include hours of operation and/or directions). In such an example, navigation process may provide 104 a heatmap that may include first graphical indicator 174 (e.g., via a first color, intensity, or shape, etc.) associated with a first navigation option (e.g., menu link 156) and may include second graphical indicator 176 (e.g., via a second color, intensity, or shape, etc.) associated with a second navigation option (e.g., directions link 160). As generally discussed above, in some instances, the order of navigation may be based on, at least in part, a frequency of navigation from a current state (e.g., a state in which the user has not already navigated to a menu for the restaurant). Prior visitors to the webpage who have not already navigated to the menu may more frequently navigate to the menu than to the hours or directions, whereas prior visitors to the webpage who had already navigated to the menu may more frequently navigate to the hours or directions than to menu again. While the order of navigation has been described in the context of a restaurant webpage, it will be appreciated that the principles may equally apply to other types of webpages and/or other circumstances.

In some implementations, the heatmap may provide an indicator of new content that may be included on the webpage and/or new links included on the webpage (or new content that may be accessed by one or more of the links on the webpage). Such an indicator may be used in connection with a first time visitor to the webpage and/or in connection with a return visitor to the webpage (e.g., a user who has been to the webpage before, e.g., as may be evidenced by user browsing history, a user account associated with both the user and the webpage, etc.). In a corresponding manner, the heatmap may be utilized to remarket an abandoned shopping cart to a returning user (e.g., a user who had previously accessed the webpage, accessed a different webpage or terminated the browsing sessions, and subsequently re-accessed the webpage), or direct a returning user to a last viewed content associated with the webpage. Consistent with such implementations, navigation process 10 may receive one or more filter criteria, or other such input, from the webpage. The input from the webpage may be utilized, at least in part, in providing 104 the visual indicator.

Figure 5:
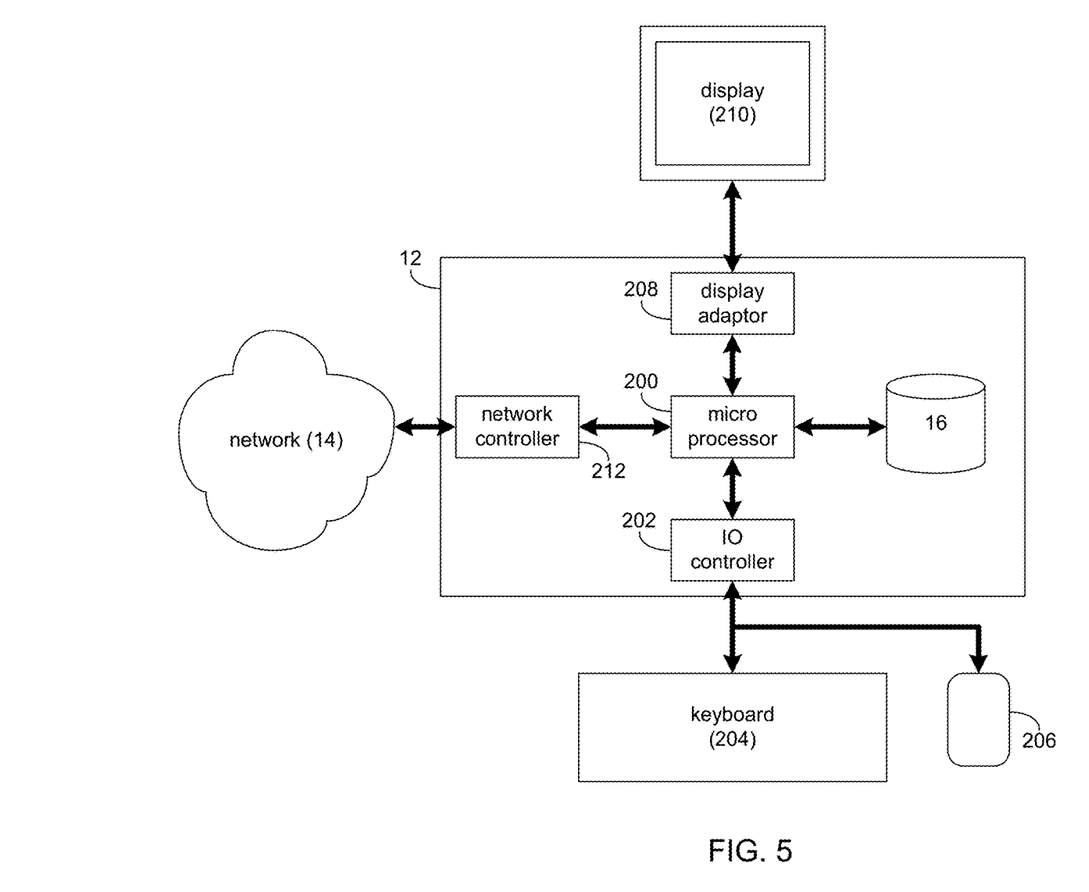
FIG. 5 is a diagrammatic view of the computing device of FIG. 1, according to an implementation of the present disclosure.

Referring also to FIG. 5, there is shown a diagrammatic view of computing system 12. While computing system 12 is shown in this figure, this is for illustrative purposes only and is not intended to be a limitation of this disclosure, as other configurations are possible. For example, any computing device capable of executing, in whole or in part, navigation process 10 may be substituted for computing device 12 within FIG. 4, examples of which may include but are not limited to client electronic devices 28, 30, 32, 34.

Computing system 12 may include microprocessor 200 configured to e.g., process data and execute instructions/code for navigation process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adapter 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   identifying, by a computing device, a plurality of navigation options associated with a webpage;
   determining, by the computing device, for a user accessing the webpage, visitor navigation patterns associated with the plurality of navigation options, based on a statistical analysis of the plurality of navigation options associated with previous visitors of the webpage that have commonality with the user, the visitor navigation patterns including information associated with navigation options that were abandoned by the previous visitors;
      wherein a navigation option is considered abandoned when a previous visitor performs a click-back within a time period of accessing the webpage, and the commonality is based on both the previous visitors and the user arriving to the webpage based on similar search terms;
   identifying a user interest based on a comparison of a geographic location of the user to content of the webpage;
   filtering the visitor navigation patterns based on the user interest by identifying a relative frequency associated with the plurality of navigation options, indicating the relative frequency with which the previous visitors selected a navigation option of the plurality of navigation options in a current visit to the webpage from a state associated with the previous visitors,
      wherein the relative frequency is determined using the visitor navigation patterns based on a statistical analysis of the plurality of navigation options associated with the previous visitors of the webpage that have commonality with the user, the state indicating whether the previous visitors had navigated to the navigation option prior to the current visit to the webpage;
   determining a navigation order in which the user will navigate to each of the plurality of navigation options in a current visit of the webpage, based on a current state of the user and the relative frequency identified for previous visitors, wherein the current state of the user indicates whether the user has navigated to each of the plurality of navigation options prior to the current visit; and
   providing the user, by the computing device, a visual indicator of the identified navigation order, the visual indicator overlaid onto the webpage and differentiating between the user being a first time visitor and a returning visitor of the webpage.

2. The computer-implemented method of claim 1, wherein the visitor navigation patterns include historical navigation data associated with the webpage.

3. The computer-implemented method of claim 1, further comprising filtering the visitor navigation patterns based on a browsing history associated with the user.

4. The computer-implemented method of claim 1, further including determining one or more user attributes, and filtering the visitor navigation patterns based on, at least in part, the one or more user attributes.

5. The computer-implemented method of claim 1, further including determining one or more session attributes, and filtering the visitor navigation patterns based on, at least in part, the one or more session attributes.

6. The computer-implemented method of claim 1, further including determining which visitor navigation patterns are accessible for filtering.

7. The computer-implemented method of claim 1, wherein the visual indicator includes a heatmap.

8. A computer program product comprising a non-transitory computer readable medium having a plurality of instructions stored thereon, which, when executed by a processor, cause the processor to perform operations comprising:
   identifying a plurality of navigation options associated with a webpage;
   determining for a user accessing the webpage, visitor navigation patterns associated with the plurality of navigation options, based on a statistical analysis of the plurality of navigation options associated with previous visitors of the webpage that have commonality with the user, the visitor navigation patterns including information associated with navigation options that were abandoned by the previous visitors;
      wherein a navigation option is considered abandoned when a previous visitor performs a click-back within a time period of accessing the webpage, and the commonality is based on both the previous visitors and the user arriving to the webpage based on similar search terms;
   identifying a user interest based on a comparison of a geographic location of the user to content of the webpage;
   filtering the visitor navigation patterns based on the user interest by identifying a relative frequency associated with the plurality of navigation options, indicating the relative frequency with which previous visitors selected a navigation option of the plurality of navigation options in current a visit to the webpage from a state associated with the previous visitors;
      wherein the relative frequency is determined using the visitor navigation patterns based on a statistical analysis of the plurality of navigation options associated with the previous visitors of the webpage that have commonality with the user, the state indicating whether the previous visitors had navigated to the navigation option in previous visits prior to the current visit to the webpage;

determining a navigation order in which the user will navigate to each of the plurality of navigation options in a current visit of the webpage, based on a current state of the user and the relative frequency identified for previous visitors, wherein the current state of the user indicates whether the user has navigated to each of the plurality of navigation option prior to the current visit; and providing the user a visual indicator of the identified navigation order, the visual indicator overlaid onto the webpage and differentiating between the user being a first time visitor and a returning visitor of the webpage.

9. The computer program product of claim 8, wherein the visitor navigation patterns include historical navigation data associated with the webpage.

10. The computer program product of claim 8, further comprising instructions for filtering the visitor navigation patterns based on a browsing history associated with the user.

11. The computer program product of claim 8, further including instructions for determining one or more user attributes, and filtering the visitor navigation patterns based on, at least in part, the one or more user attributes.

12. The computer program product of claim 8, further including instructions for determining one or more session attributes, and filtering the visitor navigation patterns based on, at least in part, the one or more session attributes.

13. The computer program product of claim 8, further including instructions for determining which visitor navigation patterns are accessible for filtering.

14. The computer program product of claim 8, wherein the visual indicator includes a heatmap.

15. A computing system comprising at least one processor, the at least one processor configured to:
identify a plurality of navigation options associated with a webpage;
determine for a user accessing the webpage, visitor navigation patterns associated with the plurality of navigation options based on a statistical analysis of the plurality of navigation options associated with previous visitors of the webpage that have commonality with the user, the visitor navigation patterns including information associated with navigation options that were abandoned by the previous visitors;
wherein a navigation option is considered abandoned when a previous visitor performs a click-back within a time period of accessing the webpage, and the commonality is based on both the previous visitors and the user arriving to the webpage based on similar search terms;
identify a user interest based on a comparison of a geographic location of the user to content of the webpage;
filter the visitor navigation patterns based on the user interest by identifying a relative frequency associated with the plurality of navigation options, indicating the relative frequency with which previous visitors selected a navigation option of the plurality of navigation options in a current visit to the webpage from a state associated with the previous visitors;
wherein the relative frequency is determined using the visitor navigation patterns based on a statistical analysis of the plurality of navigation options associated with the previous visitors of the webpage that have commonality with the user, the state indicating whether the previous visitors had navigated to the navigation option prior to the current visit to the webpage;
determine a navigation order in which the user will navigate to each of the plurality of navigation options in a current visit of the webpage, based on a current state of the user and the relative frequency identified for previous visitors, wherein the current state of the user indicates whether the user has navigated to each of the plurality of navigation option; and
provide a visual indicator of the identified navigation order, the visual indicator overlaid onto the webpage and differentiating between the user being a first time visitor and a returning visitor of the webpage.

16. The computing system of claim 15, wherein the visitor navigation patterns include historical navigation data associated with the webpage.

17. The computing system of claim 15, wherein the at least one processor is further configured for filtering the visitor navigation patterns based on a browsing history associated with the user.

18. The computing system of claim 15, wherein the at least one processor is further configured to determine one or more user attributes, and filter the visitor navigation patterns based on, at least in part, the one or more user attributes.

19. The computing system of claim 15, wherein the at least one processor is further configured to determine one or more session attributes, and filter the visitor navigation patterns based on, at least in part, one or more session attributes.

20. The computing system of claim 15, wherein the at least one processor is further configured to determine which visitor navigation patterns are accessible for filtering.

21. The computing system of claim 15, wherein the visual indicator includes a heatmap.

22. The computer-implemented method of claim 7, further comprising:
overlaying the heatmap on the webpage responsive to receiving a request for the heatmap by the user accessing the webpage.

23. The computer-implemented method of claim 7, further comprising:
providing a previously abandoned shopping cart to the returning visitor on the webpage using the heatmap, wherein the previously abandoned shopping cart is associated with the returning visitor; or
directing the returning visitor to a last viewed content associated with the webpage using the heatmap.

24. The computer-implemented method of claim 1, wherein the plurality of navigation options include new content added to the webpage.

* * * * *

UNITED STATES PATENT AND TRADEMARK OFFICE
CERTIFICATE OF CORRECTION

PATENT NO. : 9,665,547 B1  
APPLICATION NO. : 13/727888  
DATED : May 30, 2017  
INVENTOR(S) : Benjamin David Eidelson et al.

Page 1 of 1

It is certified that error appears in the above-identified patent and that said Letters Patent is hereby corrected as shown below:

In the Claims

In Column 14, Line 58, please replace "current a" with --a current--

In Column 15, Line 7, please replace "option" with --options--

In Column 16, Line 16, please replace "option" with --options--

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*